May 15, 1934.  D. W. SHERMAN  1,959,113
AUTOMOBILE FRAME
Filed Nov. 6, 1929    2 Sheets-Sheet 1
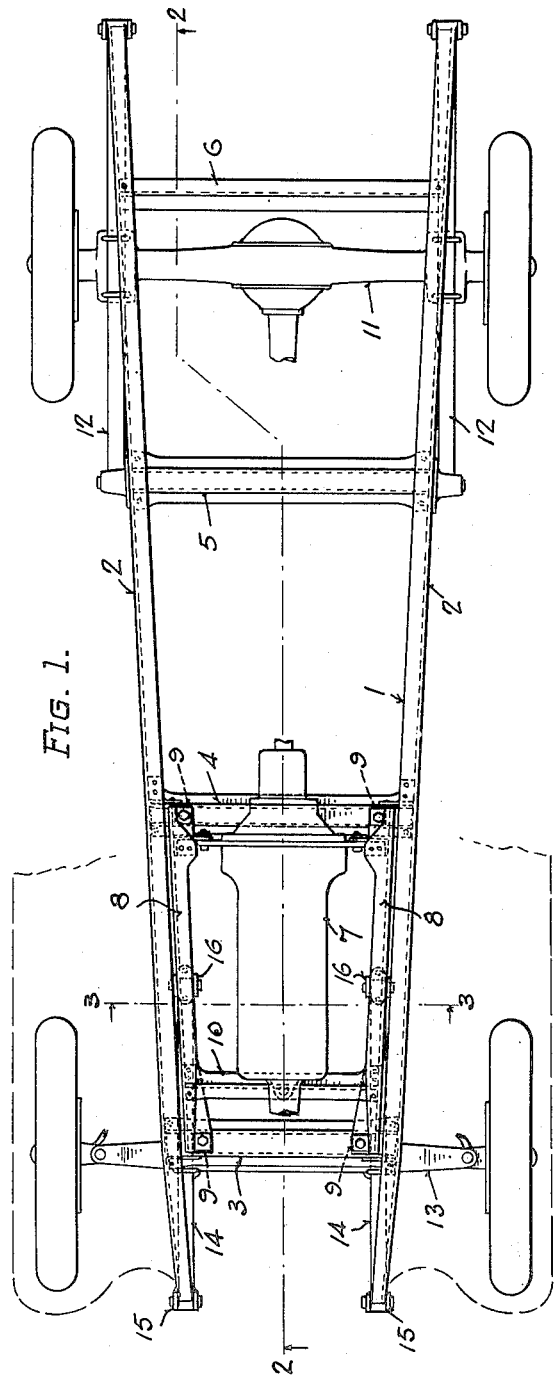
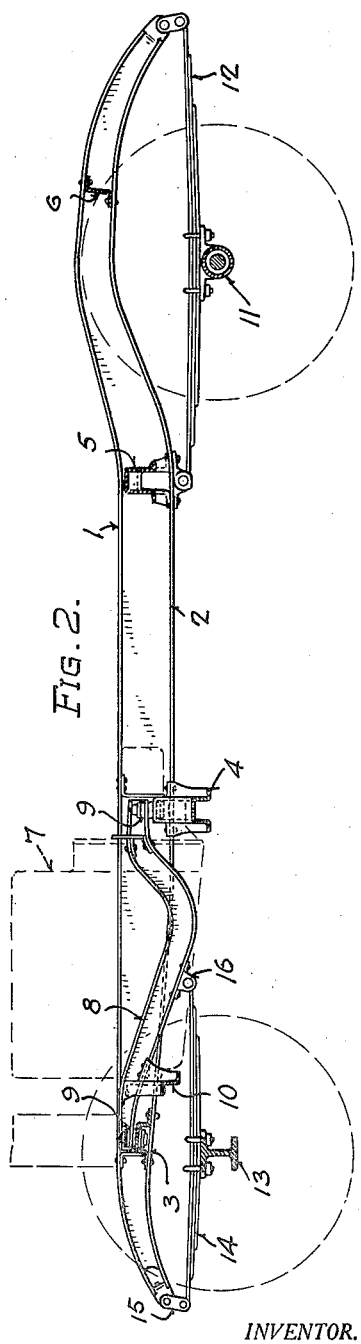
INVENTOR.
Donald W. Sherman
BY
ATTORNEY.

May 15, 1934.    D. W. SHERMAN    1,959,113
AUTOMOBILE FRAME
Filed Nov. 6, 1929    2 Sheets-Sheet 2
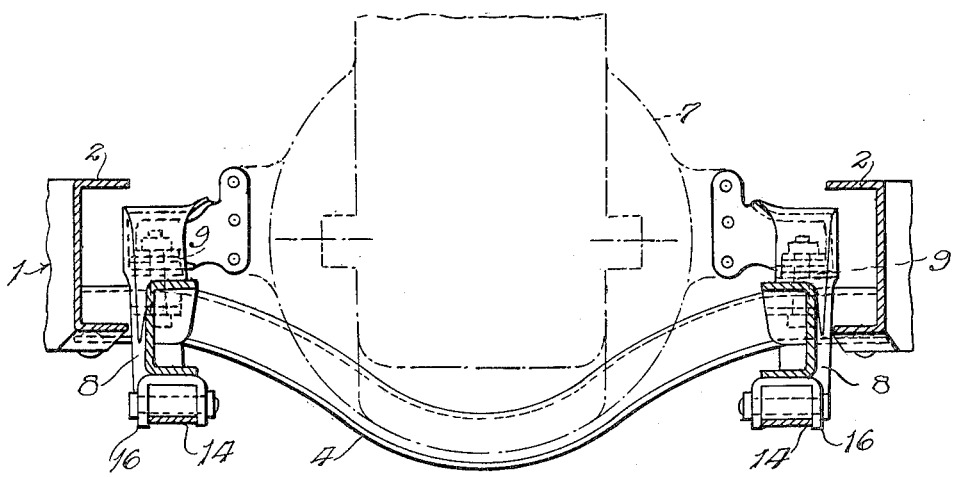
INVENTOR.
Donald W. Sherman
BY
ATTORNEY.

Patented May 15, 1934

1,959,113

UNITED STATES PATENT OFFICE 1,959,113

AUTOMOBILE FRAME

Donald W. Sherman, Milwaukee, Wis., assignor to A. O. Smith Corporation, Milwaukee, Wis., a corporation of New York Application November 6, 1929, Serial No. 405,124

4 Claims. (Cl. 180—64)

This invention relates to an automobile frame.

The object of the invention is to provide an automobile frame which will tend to eliminate excessive vibration of the radiator and front fenders of the automobile and at the same time prevent transmission of motor noises to the body of the automobile.

Another object is to provide an improved spring support for the front end of an automobile.

In accordance with the invention, the front supporting spring is attached directly to the automobile engine or to a supporting beam therefor at a point remote from the chassis frame.

By this construction, the road shocks are absorbed by the engine mass while the body of the automobile is cushioned to prevent undue vibration and noises.

The accompanying drawings illustrate an embodiment of the invention and the views therein are as follows:

Figure 1 is a top plan view of the chassis.

Fig. 2 is a section on the line 2—2 of Figure 1.

Fig. 3 is a section on the line 3—3 of Figure 1.

The chassis frame 1 of the automobile comprises two opposing channel side bars 2 rigidly connected by spaced cross bars 3, 4, 5, and 6. This frame directly supports the body of the car, including the radiator and fenders.

The engine 7 is mounted in the chassis frame 1 and supported by the two cross bars 3 and 4 by means of engine supporting beams 8. The beams 8 have rubber or other suitable cushion connections 9 with the cross bars 3 and 4.

Where the engine has a three point suspension, the front of the engine is supported at a point central of a cross bar 10 rigidly connecting the forward ends of beams 8 and the rear of the engine is directly connected to the beams 8 near the rear ends of the latter.

The rear end of the chassis frame 1 is supported upon the rear axle 11 of the automobile in any suitable manner as by the semi-elliptical springs 12.

The front end of the chassis frame 1 is supported upon the front axle 13 of the automobile by means of semi-elliptical springs 14.

The front springs 14 have their front ends connected to the front ends of their respective chassis side bars 2 by means of shackles 15, while the rear ends of the springs are fixedly connected to the respective engine supporting beams 8 by means of spring hangers 16.

Heretofore where the front springs have been connected directly to the chassis frame and the engine mounted on the chassis frame by means of cushion connections, which tended to prevent the transmission of engine noises to the body of the car, the road shocks were transmitted directly to the body of the car and caused an annoying vibration of the radiator and front fenders, while the cushion connections prevented the engine mass from efficiently absorbing these shocks.

The present invention provides a construction which retains the function of the rubber or cushion motor mounting and which at the same time allows the mass of the engine to absorb the road shocks, the remaining part of the latter being transmitted to the chassis frame and body of the automobile through the cushion motor mounting. The annoying vibration of the front end of the automobile is thus substantially eliminated.

The invention may have various modifications within the scope of the claims.

I claim:

1. In an automobile structure in combination, a chassis frame comprising oppositely disposed side bars and spaced cross bars connecting the side bars, means for supporting an engine resiliently mounted on the cross bars, a vehicle axle for carrying the automobile structure, and a vehicle spring mounted on the axle and connected to the chassis frame and engine supporting means, the connection between the vehicle spring and engine supporting means being non-resilient, whereby road shocks are transmitted through the axle to the engine.

2. In an automobile, a chassis frame comprising side bars and cross bars, axles for supporting said frame, engine supporting beams resiliently attached to said frame, an engine attached to said beams, and leaf springs having one end attached to said beams, the other end attached to said side bars and an intermediate portion attached to one of said axles.

3. In an automobile, a chassis frame comprising side bars and cross bars, axles for supporting said frame, engine supporting beams extending longitudinally of the frame and resiliently attached to adjacent cross bars, an engine attached to said beams, and leaf springs having one end attached to said beams, the other end attached to said side bars and an intermediate portion attached to one of said axles.

4. In an automobile, a chassis frame including opposed side bars and spaced cross bars rigidly connecting said side bars, axles for supporting said frame, an engine, engine supporting beams resiliently attached to certain of the cross bars of said chassis frame and supporting said engine, and springs connecting one of said axles and said engine supporting beams, said springs being attached at one end to said beams and at the other end to the chassis frame.

DONALD W. SHERMAN.